United States Patent
Majarov et al.

(10) Patent No.: US 8,153,309 B2
(45) Date of Patent: Apr. 10, 2012

(54) APPARATUS AND METHOD USING HYDROGEN PRESSURE IN FUEL CELL ELECTRIC VEHICLE

(75) Inventors: Konstantin S. Majarov, Redondo Beach, CA (US); Thomas P. O'Meara, Venice, CA (US)

(73) Assignee: GM Global Technology Operations LLC, Detroit, MA (US)

( * ) Notice: Subject to any disclaimer, the term of this patent is extended or adjusted under 35 U.S.C. 154(b) by 442 days.

(21) Appl. No.: 12/472,940

(22) Filed: May 27, 2009

(65) Prior Publication Data

US 2010/0304228 A1  Dec. 2, 2010

(51) Int. Cl.
  *H01M 8/06* (2006.01)
(52) U.S. Cl. .............................. 429/408; 429/434
(58) Field of Classification Search .............. 429/408, 429/434, 440; 320/101
  See application file for complete search history.

(56) References Cited

U.S. PATENT DOCUMENTS

| | | | | |
|---|---|---|---|---|
| 3,976,507 A * | 8/1976 | Bloomfield | ................ | 429/415 |
| 5,900,330 A * | 5/1999 | Kagatani | ................ | 429/422 |
| 5,968,680 A * | 10/1999 | Wolfe et al. | ................ | 429/425 |
| RE37,284 E | 7/2001 | Li et al. | | |
| 6,706,439 B2 | 3/2004 | Herrmann | | |
| 7,767,359 B2 * | 8/2010 | Hoffjann et al. | ............ | 429/513 |
| 2008/0070078 A1 * | 3/2008 | Gummalla et al. | ............ | 429/26 |
| 2008/0187789 A1 * | 8/2008 | Ghezel-Ayagh | ............ | 429/13 |

* cited by examiner

*Primary Examiner* — Hae Moon Hyeon
(74) *Attorney, Agent, or Firm* — Ingrassia Fisher & Lorenz, P.C.

(57) ABSTRACT

A hydrogen fuel cell system (100) for charging a battery (116) of an electric vehicle, includes at least one tank (102) for storing hydrogen under pressure. A combined heat exchanger and air engine (104) expands the pressurized hydrogen and converts the expanding hydrogen into mechanical energy. A plurality of fuel cells (106) receive the expanded hydrogen for supplying heat to the heat exchanger and air engine (104) and supplying a first current for charging the battery (116). A generator (108) generates a multi-phase voltage in response to the mechanical energy. A electrical power converter (110) responsive to the multi-phase voltage provides a second current for charging the battery (116).

19 Claims, 3 Drawing Sheets

APPARATUS AND METHOD USING HYDROGEN PRESSURE IN FUEL CELL ELECTRIC VEHICLE

FIELD OF THE INVENTION

The present invention generally relates to a fuel cell system for charging a battery of an electric vehicle, and more particularly relates to a system and method for extracting energy from pressurized hydrogen.

BACKGROUND OF THE INVENTION

In recent years, advances in technology, as well as environmental concerns and ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles. Such vehicles often use two separate voltage sources, for example, a battery and a fuel cell, to power the electric motors that drive the wheels.

In July 2006 there were between 60,000 and 76,000 battery powered vehicles in use in the United States, increasing to an estimated over 100,000 battery powered vehicles in use today. Typically, one or more batteries provide electrical power, which is converted into mechanical power for turning the wheels. When the energy in the battery is depleted, the battery may be recharged.

Hydrogen fuel cells used to power cars with electric motors are two to three times more efficient than gas powered internal combustion engines, have zero-emissions, and are quiet and vibration free. Hydrogen is readily found, and may be extracted from natural gas, coal, crude oil, and the like, but preferably may be produced from water by a pollution free process of electrolysis.

Electricity from a fuel cell is created in a chemical reaction that occurs when hydrogen and oxygen are combined, with water being the only byproduct. To power a vehicle, typically hundreds of fuel cells are stacked together in series, combining their individual electrical outputs. Hydrogen typically is stored under pressure aboard the vehicle and supplied to the fuel cells under reduced pressure. However, energy is lost (wasted) when converted from a high pressure to the lower pressure for supplying the fuel cell.

Typically, known systems use a flow regulator and injectors, with pressure energy being wasted. Other known compressed air energy storage systems have used gas burners to preheat air during the expansion process, using only this source for energy output.

Yet another known system, disclosed in U.S. Pat. No. 6,706,439 assigned to the assignee of the present disclosure, returns the non-consumed hydrogen to storage, but does not utilize the pressure of expanding hydrogen.

Accordingly, it is desirable to provide a more efficient method and system for converting pressurized hydrogen to electricity for recharging the battery of an electric vehicle. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

An apparatus is provided for charging a battery of an electric vehicle. The apparatus includes at least one tank for storing hydrogen under pressure. A combined heat exchanger and air engine expands the pressurized hydrogen and converts the expanding hydrogen into mechanical energy. A plurality of fuel cells receives the expanded hydrogen for supplying heat to the heat exchanger and a first current for charging the battery. A generator generates a multi-phase voltage in response to the mechanical energy. An electrical power converter responsive to the multi-phase voltage provides a second current for charging the battery.

A method for charging the battery of a vehicle includes providing pressurized hydrogen to a combined heat exchanger and air engine, expanding the pressurized hydrogen in the heat exchanger and air engine, transferring heat to the heat exchanger and air engine, creating mechanical energy by the heat exchanger and air engine from the expanding hydrogen, converting the mechanical energy into a first electric current, converting the expanded hydrogen to a second electric current in a fuel cell, and charging a battery with the first and second electric currents.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any expressed or implied theory presented in the preceding technical field, background, brief summary or the following detailed description.

A system and method for extracting pressure energy and regulating hydrogen flow reuses waste heat to heat hydrogen during expansion when released from pressurized storage to increase range/distance of an electric vehicle. Heat is provided to the expanding hydrogen which drives a multi-stage "air" (hydrogen powered) engine and thus a generator for providing electricity to charge the electric vehicle's battery. It should be understood that "air" is used to describe a type of engine, and is not limited to using air (a combination mainly of oxygen and nitrogen gases) as popularly defined. The term "air" could include any gas (as opposed to a solid or liquid) such as hydrogen in this case. Since the air engine shaft torque is controlled by the generator, it also serves as a flow control system, eliminating the need for a separate flow control device. The expanded hydrogen is supplied to a fuel cell which provides the primary current for charging the battery. The vehicle may be any type of transportation device for people or cargo such as automobiles, trucks, boats, aircraft, or the like. Rechargeable battery materials used in electric vehicles typically are NiCd, nickel metal hydride, lithium ion, lead acid, Li-ion polymer, zinc-air, or molten salt.

Figure 1:
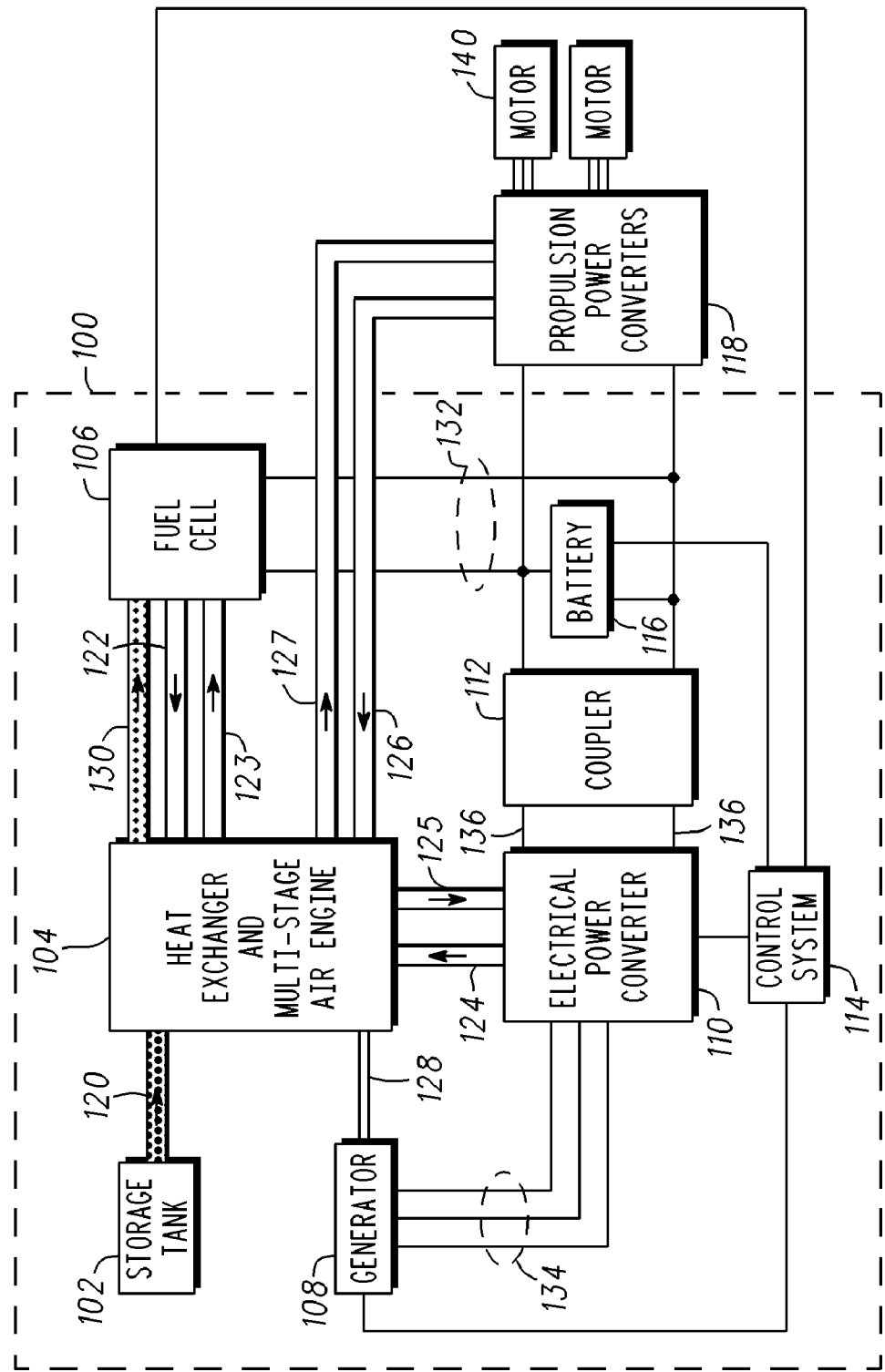
FIG. 1 is a block diagram of an exemplary embodiment.
Figure 2:
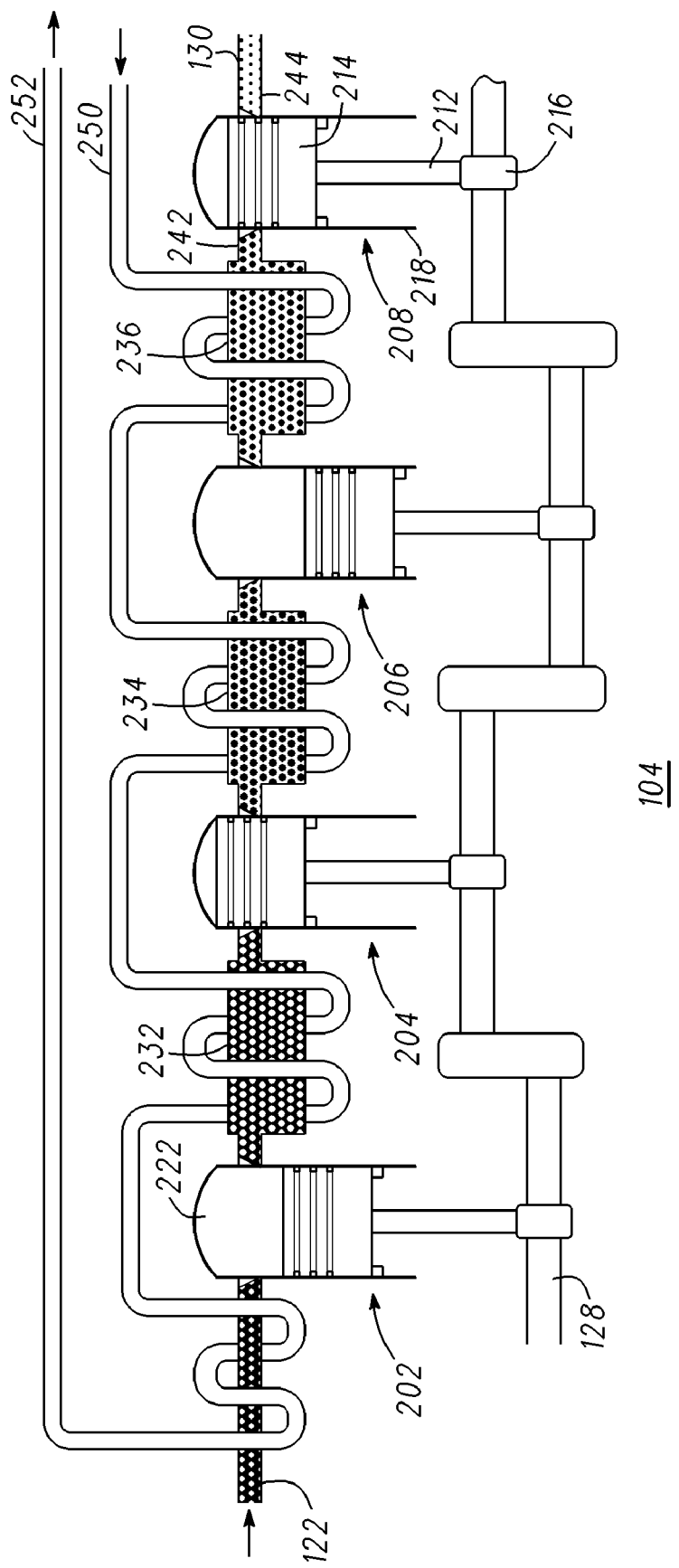
FIG. 2 is a schematic view of an exemplary heat exchanger and air engine for use with the exemplary embodiment of FIG. 1.

Referring to FIG. 1, the system 100 includes one or more storage tanks 102 for storing hydrogen under pressure, a combination heat exchanger and multi-stage air engine 104 driven by pressurized hydrogen, one or more fuel cells 106, a multi-phase generator 108, an electrical power converter 110, a coupler 112, and a control system 114 for charging a battery 116. The amount of stored hydrogen, for example in an exemplary embodiment of an automobile, may be about 4.2 kilograms at a pressure of 700 bar. The hydrogen in the storage tanks 102 is supplied through conduits 122 to the heat exchanger and multi-stage air engine 104. Heat may be provided to the heat exchanger and multi-stage air engine 104 from the fuel cells 106 via conduits 124, the electrical power converter 110 via conduits 126, and propulsion power converters 118 via conduit 127. The propulsion power converters 118 provide power to the motors 140 that propel the vehicle or drive auxiliary systems such as heating, ventilating, and air conditioning (HVAC) and a transmission oil pump/air compressor. The expanding hydrogen in the heat exchanger and multi-stage air engine 104 creates mechanical energy that is transferred by the shaft 128 to the generator 108. The type of engine subsequently described herein with reference to FIG. 2 is a piston driven air engine; however, it should be understood that other types of engines could be used. For example, one type is a Wankel engine which uses a rotary design to convert pressure into a rotating motion. Another type is a pistonless rotary engine (quasi-turbine) similar to the Wankel engine, but which uses a rhomboidal rotor whose sides are hinged at the vertices providing an increased volume ratio. Another type of rotary engine that may be used is the rotary air engine (Di Pietro motor), which uses a simple cylindrical rotary piston which rolls without friction inside the cylindrical stator The expanded hydrogen from the heat exchanger and multi-stage air engine 104 is transferred via conduit 130 to the fuel cells 106. While an arrangement of fuel cells may be a single cell, it is preferred that a plurality, or stack, of fuel cells is used. Each fuel cell has a proton permeable membrane with electrodes on both sides, and a cathode and an anode, which both have a catalytic coating. Hydrogen is supplied to the stack at the anode side at a certain overpressure, e.g., a pressure above atmospheric pressure. At the cathode side, air is likewise supplied to the stack with a suitable overpressure. In the operation of the fuel cell, protons, which are delivered by the hydrogen, diffuse through the membrane and react at the cathode side of the membrane with the air that is supplied. In this way, water vapor is formed and led away as an exhaust gas at the cathode side and current is produced, which can for example, be used to drive a vehicle in which the fuel cell arrangement is incorporated. An example of such a fuel cell is described in U.S. Pat. No. RE37,284, assigned to the assignee of the present disclosure.

The generator 108, in response to the mechanical energy of the rotating shaft 128, generates a multi-phase voltage supplied on conductors 134 to the electrical power converter 110, which converts the multi-phase voltage to a second current which is supplied via conductors 136 for charging the battery 116. More specifically, the control system 114 measures battery and generator voltages and currents, receives hydrogen flow information from the fuel cell, and controls the generator to maintain torque on the heat exchanger and multi-stage air engine 104 to meet hydrogen flow demand from the fuel cell 106. While a three phase voltage is shown, any multi-phase voltage may be used. The electrical power converter 110 regulates the flow of hydrogen. If the demand for power is low (fuel cell 106 is requesting a low hydrogen flow), the shaft 128 will rotate at a low speed since the control system 114 commands higher torque on the generator 108. When the fuel cell 106 demands more hydrogen flow (increased vehicle torque or speed request) the control system 114 reduces the torque command, thus increasing the speed on the shaft 128 and allowing more hydrogen to flow through the heat exchanger and multi-stage air engine 104. Heat is supplied to the form of a medium, such as a gas or liquid, from at least one of the fuel cell 106 via conduit 122 and returned via conduit 123, the electrical power converter 110 via conduit 124 and returned via conduit 125, and the propulsion power converters 118 via conduit 126 and returned via conduit 127. In this arrangement, the heat exchanger and multi-stage air engine 104 is not only extracting pressure energy, it is also performs flow regulation that is normally performed by a separate flow regulator valve present in known systems. Therefore, the heat exchanger and multi-stage air engine 104 effectively extracts energy and performs a flow regulation. Another type of generator 108 known as a Linear Generator may be used. Electrical power generation can be achieved with a free piston motor having magnets attached to the pistons which create a current in coils through which the piston move.

A schematic view of the heat exchanger and multi-stage air engine 104 is shown in FIG. 2 and includes four pistons 202, 204, 206, 208 disposed to receive in sequence the pressurized hydrogen via conduit 122. Each of the pistons 202, 204, 206, 208 have a piston shaft 212 connected between a piston head 214 and a rotary-entrainment device 216. The piston head 214 fits flush within a cylinder wall 218 so it may move freely therewithin. The rotary-entrainment device 216 converts a linear movement of the piston shaft 212 to a rotary movement of the drive shaft 128 in a well known manner. Hydrogen enters the upper portion 222 of the piston 202 from conduit 122 forcing the piston head 214 down and proceeds to each of the other pistons 204, 206, 208 via expansion chambers 232, 234, 236, respectively. Flow control valves 242 and 244 on either sides of the upper portion 222 of the pistons 202, 204, 206, 208 control the direction of the hydrogen flow and allow proper movement of the piston heads 214. Heat is provided via conduit 250 from at least one of the fuel cell 106, the electrical power converter 110, and the propulsion power converters 118. The conduit 250 is disposed contiguous, and preferably wraps around, each of the expansion chambers 232, 234, 236 and the conduit 122. The heat in the conduit 250 is exchanged with the "cooler" hydrogen undergoing expansion and returns to its source via conduit portion 252. The heat may be presented as a heated gas, such as from air surrounding the electrical power converter 110, or a heated liquid, such as from the propulsion power converters 118. Though the heat may be supplied to the pistons 202. 204. 206, 208 in any order, it is preferred to be applied first to the piston having the hydrogen with the lowest pressure applied thereto. Since hydrogen first is provided to the piston 202, the hydrogen pressure will be greatest at piston 202. Since the hydrogen pressure is expanded within the expansion chambers 232, 234, 236, the pressure is lowest in piston 208. Therefore, it is preferable to provide the heat first to piston 208. The heated medium, now cooler after passing through each of the pistons 202, 204, 206, 208, is then either expelled or returned to its source (such as in the case of a liquid from the propulsion power converters).

Figure 3:
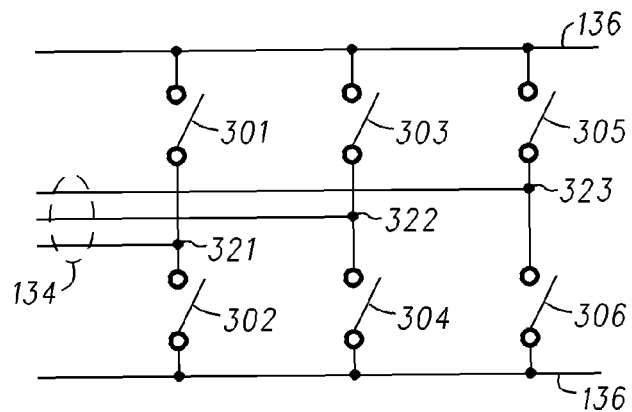
FIG. 3 is a schematic of an exemplary embodiment of an electrical power converter for use with the exemplary embodiment of FIG. 1.

FIG. 3 is a schematic representation of a typical electrical power converter 110 including power switches 301, 302 coupled in series, power switches 303, 304 coupled in series, and power switches 305, 306 coupled in series, each series pair coupled between connectors 136. The three phase voltage is applied via conductors 134 respectively to nodes 321, 322, 323 between switches 301, 302, switches 303, 304, and switches 305, 306, respectively, with a control signal applied to each switch and an output current is applied via terminals 136. The electrical power converter 110 would have circuitry (not shown) to provide coupling and safety shutdown between the battery terminals and electrical power converter output.

Figure 4:
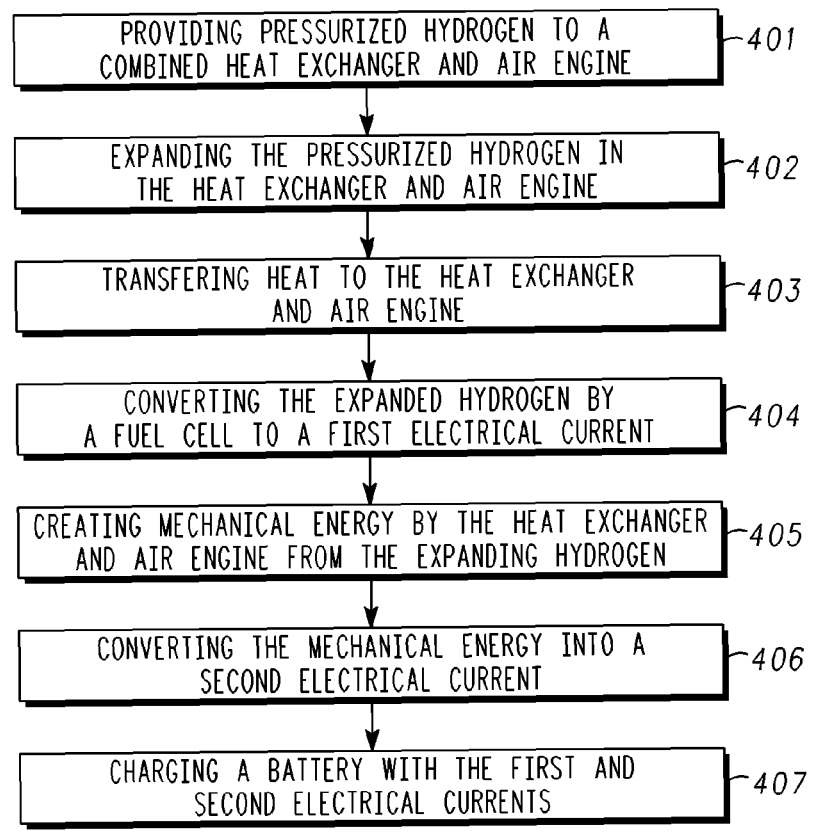
FIG. 4 is a flow chart of an exemplary method using the exemplary embodiment of FIG. 1.

Referring to FIG. 4, a method for charging a battery of an electric vehicle includes providing 401 pressurized hydrogen to a combined heat exchanger and air engine, expanding 402 the pressurized hydrogen in the heat exchanger and air engine, transferring 403 heat to the heat exchanger, converting 404 the expanded hydrogen in a fuel cell to a first electric current, creating 405 mechanical energy by the heat expander and air engine from the expanded hydrogen, converting 406 the mechanical energy into a second electric current, and charging 407 the battery with the first and second electric currents.

The following discussion explains how much energy may be saved in an electric vehicle using the exemplary embodiment. When a gas is compressed, energy is stored therein. Below is a formula to calculate maxim theoretical energy stored in a pressurized tank.

$$U = \frac{P_h V_h}{\gamma - 1}\left[1 - \left(\frac{P_1}{P_h}\right)^{\frac{\gamma-1}{\gamma}}\right] \quad [1]$$

where
$V_h$=The volume of the vessel,
$P_h$=The absolute pressure of the vessel,
$P_1$=The absolute pressure to which the vessel would drop if it open (generally this would be one atmosphere (14.696 psi or 101,300 pascals), a pascal is a newton per square meter),
γ=The adiabatic exponent or ratio of specific heats, Cp/Cv (γ is 1.4 for hydrogen,
$V_h$=117 liter,
$P_h$=700 atmospheres (1 bar=0.986 923 169 314 atmosphere (1.0 for simplicity), and
$P_1$=1 atmosphere.
Therefore, $$U = \frac{700 * 117}{0.4}\left[1 - \left(\frac{1}{700}\right)^{\frac{0.4}{1.4}}\right] = 173248$$

Thus, U=173,248 liter atmosphere, wherein 1 liter atmosphere=0.028145833333 watt hour, resulting in 173,248*0.028145833333=4,876.209333275584 or 4.8 kWh, the absolute theoretical maximum energy stored in the tank.

Considering an exemplary vehicle performance at 240 watt hours per mile, an additional 4,800/240=20 miles per tank is obtainable, providing an additional 10% range (assuming 200 miles range per tank).

This method of charging the battery 116 of an electric vehicle uses waste heat from at least one of fuel cells 106, a electrical power converter 104, propulsion power converters 118, and other vehicle heat sources to heat expanding hydrogen that is converted to mechanical energy for driving a generator 108 to provide a multi-phase voltage that is converted to a current for charging the battery. The electrical power converter 110 regulates the flow of hydrogen. If the demand for power is low (fuel cell 106 requesting low hydrogen flow), the shaft 128 will rotate at a low speed since the electrical power converter control system commands higher torque on the generator. Once the fuel cell 106 demands more hydrogen flow (increased vehicle torque or speed request), the control system 114 reduces the torque command, thus increasing the speed on the shaft 128 and allowing more hydrogen to flow through the heat exchanger and air engine 104. Therefore, the heat exchanger and air engine 104 not only extracts pressure energy, it also performs flow regulation that is normally performed by a separate flow regulator valve. In this way, the heat exchanger and air engine 104 effectively extracts energy and performs a flow regulation The method of extracting energy from a pressurized gas is not limited to a fuel cell system for powering electrical vehicles. In one exemplary embodiment, the storage tank 102 may be a supply line carrying pressurized natural gas, and the fuel cell 106 may be a device that consumes the expanded gas without supplying electric current. The gas may comprise hydrogen, natural gas, or propane, for example. One exemplary embodiment of the system 100 of FIG. 1 may be a natural gas powered vehicle wherein the expanded gas is consumed by an internal combustion engine and the electric current provided by the heat exchanger and air engine 104, generator 108, and electrical power converter 110 is provided to recharge the battery or supply other electrical consumers such as lights, car entertainment systems, HVAC, and the like. Another exemplary embodiment would be a recreational vehicle that uses the system 100 to cook food and charge the vehicle's battery.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment or exemplary embodiments. It should be understood that various changes can be made in the function and arrangement of elements without departing from the scope of the invention as set forth in the appended claims and the legal equivalents thereof.

What is claimed is:
1. A system for providing an electric current, comprising:
a combined heat exchanger and air engine for receiving and expanding pressurized gas and converting the expanding gas into mechanical energy;
a device receiving and consuming the expanded gas;
a generator generating a multi-phase voltage in response to the mechanical energy; and
an electrical power converter responsive to the multi-phase voltage for providing a first electric current,
wherein heat from the device is supplied to the heat exchanger and air engine from at least one of the device and the electrical power converter for heating the pressurized gas, and the device provides a second electric current from the expanded gas.

2. The system of claim 1 wherein the heat exchanger and air engine includes one of the group consisting of a rotary engine, a pistonless engine, a cylindrical rotary piston engine, and a magnetic piston engine.

3. The system of claim 1 wherein the expanding gas comprises hydrogen.

4. The system of claim 3 wherein the device is a fuel cell that provides the second electrical current, the first and second electrical currents being coupled to charge a battery.

5. The system of claim 4 further including a motor and propulsion power converters for powering the motor in response to power from the battery, the propulsion power converters being coupled to the heat exchanger and air engine for supplying heat thereto.

6. The system of claim 1 wherein the expanding gas comprises natural gas.

7. The system of claim 1 wherein the expanding gas comprises propane.

8. The system of claim 1 wherein the device is a device for cooking food.

9. A hydrogen fuel cell system for charging a battery of an electric vehicle, the battery coupled to propulsion power converters for driving a motor of the electric vehicle, comprising:
  at least one tank capable of containing hydrogen gas under pressure;
  a combined heat exchanger and multi-stage air engine for expanding the pressurized hydrogen, converting the expanded hydrogen gas into mechanical energy, and regulating the hydrogen gas flow;
  a fuel cell receiving the expanded hydrogen gas for providing a first current for charging the battery;
  a generator converting the mechanical energy into a multi-phase voltage; and
  an electrical power converter responsive to the multi-phase voltage for providing a second current for charging the battery,
  wherein heat from at least one of the fuel cell, electrical power converter, and the propulsion power converters is supplied to the combined heat exchanger and multi-stage air engine for heating the pressurized hydrogen.

10. The hydrogen fuel cell system of claim 9 wherein the combined heat exchanger and multi-stage air engine comprises one of the group selected from a rotary engine, a pistonless engine, a cylindrical rotary piston, and a piston engine having magnets attached to a piston and a piston cylinder including coils through which the piston passes.

11. The hydrogen fuel cell system of claim 9 wherein the combined heat exchanger and multi-stage air engine is coupled to the electrical power converter for receiving heat therefrom.

12. The hydrogen fuel cell system of claim 9 wherein the combined heat exchanger and multi-stage air engine is coupled to the propulsion power converters for receiving heat therefrom.

13. The hydrogen fuel cell system of claim 9 wherein the generator comprises a generator providing a voltage having at least three phases.

14. The hydrogen fuel cell system of claim 9 wherein the combined heat exchanger and multi-stage air engine comprises:
  a plurality of pistons;
  a plurality of expansion chambers, one each disposed between two of the plurality of pistons;
  a first conduit coupling the plurality of pistons and the plurality of expansion chambers in series between the at least one tank and the fuel cell; and
  a second conduit disposed contiguous to each of the expansion chambers for transferring the heat.

15. A method for charging a battery of a vehicle, comprises:
  providing pressurized hydrogen to a combined heat exchanger and air engine;
  expanding the pressurized hydrogen in the heat exchanger and air engine;
  providing the expanded pressurized hydrogen to a fuel cell;
  transferring heat from the fuel cell to the heat exchanger and air engine for heating the pressurized hydrogen;
  creating mechanical energy by the heat exchanger and air engine from the expanding hydrogen;
  converting the mechanical energy into a first electric current by a generator coupled to the heat exchanger and air engine;
  converting the expanded hydrogen to a second electric current in the fuel cell; and
  charging the battery with the first and second electric currents.

16. The method of claim 15 wherein the converting the mechanical energy step comprises:
  converting the mechanical energy into a multi-phase voltage; and
  converting the multi-phase voltage into the first electric current.

17. The method of claim 15 wherein the transferring step comprises transferring heat from a electrical power converter that converts the mechanical energy into a multi-phase voltage.

18. The method of claim 15 wherein the transferring step comprises transferring heat from the fuel cell.

19. The method of claim 15 wherein the transferring step comprises transferring heat from propulsion power converters that provide current from the battery to a motor that propels the vehicle.

* * * * *